United States Patent
Nguyen et al.

(10) Patent No.: US 6,302,207 B1
(45) Date of Patent: Oct. 16, 2001

(54) METHODS OF COMPLETING UNCONSOLIDATED SUBTERRANEAN PRODUCING ZONES

(75) Inventors: Philip D. Nguyen, Duncan, OK (US); Brahmadeo T. Dewprashad, Jamaica, NY (US); Kirk L. Schreiner, Duncan, OK (US); Ronald D. Dusterhoft, Katy, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/505,939

(22) Filed: Feb. 15, 2000

(51) Int. Cl.$^7$ .............................. E21B 43/02; E21B 43/04
(52) U.S. Cl. ...................... 166/276; 166/278; 166/295; 166/300; 166/309
(58) Field of Search ..................................... 166/276, 278, 166/295, 300, 309; 507/202; 523/131

(56) References Cited

U.S. PATENT DOCUMENTS

| | | | | |
|---|---|---|---|---|
| 2,207,334 | * | 7/1940 | Reynolds et al. | 166/278 |
| 3,587,741 | * | 6/1971 | Casey | 166/278 |
| 3,722,591 | * | 3/1973 | Maxson | 166/295 |
| 3,782,466 | * | 1/1974 | Lawson et al. | 166/295 X |
| 3,826,310 | * | 7/1974 | Karnes | 166/276 |
| 4,614,754 | * | 9/1986 | Christman | 523/131 X |
| 4,633,946 | * | 1/1987 | Jackson | 166/295 X |
| 4,920,153 | | 4/1990 | Allen et al. | 521/60 |
| 5,525,637 | | 6/1996 | Henn et al. | 521/59 |
| 5,669,445 | | 9/1997 | Edwards | 166/278 |
| 5,763,498 | | 6/1998 | Knaus | 521/60 |
| 5,783,611 | | 7/1998 | Strebel | 521/51 |
| 5,871,049 | * | 2/1999 | Weaver et al. | 166/276 |
| 5,934,376 | * | 8/1999 | Nguyen et al. | 166/278 |
| 5,996,693 | * | 12/1999 | Heathman | 166/309 X |
| 6,016,870 | * | 1/2000 | Dewprashad et al. | 166/295 |

* cited by examiner

*Primary Examiner*—George Suchfield
(74) *Attorney, Agent, or Firm*—Robert A. Kent; C. Clark Dougherty, Jr.

(57) ABSTRACT

Improved methods of completing subterranean producing zones containing unconsolidated sands penetrated by well bores are provided. The methods are basically comprised of placing a sand screen in the zone, isolating the annulus between the sand screen and the well bore in the zone, introducing particulate solids and foam forming pellets or open cell foam pieces with or without particulate solids and foam forming pellets into the annulus between the sand screen and the well bore to thereby form a formation sand screening permeable pack in the annulus. When utilized, the foam forming pellets are activated by heat or other means to form a foam which expands and solidifies in the pack thereby eliminating voids and strengthening the pack.

20 Claims, No Drawings

METHODS OF COMPLETING UNCONSOLIDATED SUBTERRANEAN PRODUCING ZONES

BACKGROUND OF THE INVENTION

1. Field of the Invention

The present invention relates to improved methods of completing wells in unconsolidated subterranean zones, and more particularly, to improved methods of completing such wells whereby the migration of sand with the fluids produced therefrom is prevented.

2. Description of the Prior Art

Oil and gas wells are often completed in unconsolidated formations containing loose and incompetent sand which migrates with fluids produced by the wells. The presence of formation sand in the produced fluids is disadvantageous and undesirable in that the particles abrade pumping and other producing equipment and reduce the fluid production capabilities of producing zones in the wells. Heretofore, unconsolidated subterranean producing zones have been completed by forming gravel packs in the well bore adjacent the producing zones. The gravel packs serve as filters and function to prevent formation sand from migrating with produced fluids into the well bores.

In a typical gravel pack completion, a screen is placed in the well bore and positioned within the unconsolidated subterranean producing zone which is to be completed. The screen is typically connected to a tool which includes a production packer and a crossover, and the tools is in turn connected to a work or production string. A particulate material which is usually graded sand, often referred to in the art as gravel, is pumped in a slurry down the work or production string and through the crossover whereby it flows into the annulus between the screen and the well bore. The liquid forming the slurry leaks off into the subterranean zone and/or through the screen which is sized to prevent the particulate material in the slurry from flowing therethrough. As a result, the particulate material is deposited in the annulus around the screen whereby it forms a gravel pack. The size of the particulate material in the gravel pack is selected such that it prevents formation sand from flowing into the well bore with produced fluids.

A problem which is often encountered in forming gravel packs, particularly gravel packs in long and/or deviated unconsolidated producing zones, is the formation of particulate material bridges in the annulus. That is, non-uniform packing of the particulate material in the annulus between the screen and the well bore often occurs as a result of the loss of carrier liquid into high permeability portions of the subterranean zone. This, in turn, causes the formation of particulate material bridges in the annulus before all of the particulate material has been placed. The particulate material bridges block further flow of the slurry through the annulus which leaves voids below the bridges. When the well is placed on production, the flow of produced fluids is concentrated through the voids in the gravel pack which soon causes the screen to be eroded and the migration of formation sand with the produced fluids to result.

Thus, there are needs for improved methods of completing wells utilizing gravel packs whereby voids in the gravel packs do not occur or are eliminated prior to when the wells are placed on production.

SUMMARY OF THE INVENTION

The present invention provides improved methods of completing subterranean producing zones containing unconsolidated sand which meet the needs described above and overcome the deficiencies of the prior art. A method of this invention is basically comprised of the steps of placing a sand screen in the zone to be completed, isolating the annulus between the screen and the well bore in the zone, introducing a mixture of particulate material and foam forming pellets into the annulus between the sand screen and the well bore whereby the mixture of particulate material and foam forming pellets is packed into the annulus and activating the foam forming pellets whereby foam is formed in the annulus which expands and solidifies therein thereby eliminating voids and strengthening the resulting permeable pack.

An alternate embodiment of the methods of the present invention basically comprises the steps of placing a sand screen in the subterranean zone to be completed, isolating the annulus between the sand screen and the well bore in the zone, and then introducing a plurality of solidified open cell foam pieces into the annulus between the sand screen and the well bore whereby the foam pieces are uniformly packed into the annulus. The open cells of the foam pieces are of a size such that the unconsolidated sand is prevented from entering the cell but produced fluids can flow therethrough. The solidified open cell foam pieces do not readily form bridges in the annulus between the sand screen and the well bore and can be uniformly packed in the annulus. Optionally, particulate solids can be introduced into the annulus along with the open cell foam pieces. Also, the open cell foam pieces and the particulate solids, if used, can be coated with a hardenable resin which upon hardening consolidates the pack formed into a permeable mass. Additionally, foam forming pellets can be included with the open cell foam pieces and solid particles, if used, which upon activation expands and solidifies in the pack.

It is, therefore, a general object of the present invention to provide improved methods of completing unconsolidated subterranean producing zones.

Other and further objects, features and advantages of the present invention will be readily apparent to those skilled in the art upon a reading of the description of preferred embodiments which follows.

DESCRIPTION OF PREFERRED EMBODIMENTS

The present invention provides improved methods of completing unconsolidated subterranean zones penetrated by well bores. In accordance with the improved methods of the invention, conventional gravel pack forming tools well known to those skilled in the art are utilized. That is, a conventional sand screen is placed in the subterranean zone to be completed. The sand screen is connected to a conventional cross-over and production packer which is in turn connected to a production string or work string. The production packer is set in the well which isolates the annulus between the sand screen and the well bore. Thereafter, a mixture of particulate material is introduced into the annulus by way of the cross-over so that the particulate material is packed into the annulus.

In one embodiment of the present invention, the particulate material utilized is a mixture of graded sand or other similar material such as ceramic beads, plastic beads, glass beads and the like and foam forming pellets. After the mixture of particulate material and form forming pellets is placed in the annulus, the foam forming pellets are activated whereby foam is formed in the annulus which expands and solidifies therein thereby eliminating voids and strengthening the resulting permeable particulate material pack whereby it effectively prevents unconsolidated formation sand from flowing into the well bore with produced fluids.

The particulate material utilized in accordance with the present invention is preferably graded sand which is sized based on a knowledge of the size of the formation fines and sand in the unconsolidated zone to prevent the formation fines and sand from passing through a permeable pack of the graded sand. The sand generally has a particle size in the range of from about 10 to about 70 mesh, U.S. Sieve Series. Preferred sand particle size distribution ranges are one or more of 10–20 mesh, 20–40 mesh, 40–60 mesh or 50–70 mesh, depending on the particle size and distribution of the formation fines and sand to be screened out by the particulate material.

A variety of foam forming pellets can be utilized which are activated by the heat in the subterranean zone, by steam injection or other suitable techniques. The foam forming pellets are generally comprised of a thermoplastic polymer containing a foaming agent. When the pellets are activated, the thermoplastic polymer is liquefied and foamed by the foaming agent. Examples of foam forming beads which can be utilized in accordance with this invention are described in U.S. Pat. No. 4,920,153 issued to Allen et al. on Apr. 24, 1990; U.S. Pat. No. 5,525,637 issued to Henn et al. on Jun. 11, 1996; U.S. Pat. No. 5,763,498 issued to Knaus on Jun. 9, 1998; and U.S. Pat. No. 5,783,611 issued to Strebel on Jul. 21, 1998; which are incorporated herein by reference.

As will be understood by those skilled in the art, the particulate material and foam forming beads are introduced into the annulus by means of a carrier fluid in which the particulate material and foam forming beads are suspended. The carrier fluid and mixture of particulate material and foam forming beads suspended therein are pumped into the annulus between the sand screen and the well bore, and into perforations if the well bore is cased and cemented which extend therethrough into the producing zone. That is, a carrier fluid slurry of the particulate material and foam forming pellets is pumped from the surface through the work or production string and cross-over into the annulus and perforations. The particulate material and foam forming pellets are packed into the annulus as the carrier fluid flows through the sand screen and upwardly into the well bore by way of the cross-over. While a variety of carrier fluids can be utilized, a preferred carrier fluid is a well completion brine. If fluid loss is a problem, an aqueous nitrogen foam or an aqueous carbon dioxide foam can be utilized in place of the completion brine.

As will now be understood, the foam formed by the foam forming pellets described above expands and solidifies in the annulus between the sand screen and the walls of the well bore whereby the particulate material therein is compressed. This compression eliminates voids in the particulate material and provides strength to the particulate material pack which retains its porosity as a result of inter-particle void spaces in the pack. The use of the foam forming beads generally makes the use of a hardenable resin unnecessary. However, if it is desirable to increase the strength of the particulate material pack further, the particulate material can be coated with a hardenable resin composition which hardens and consolidates the particulate material into a permeable mass as will be described further hereinbelow.

In another embodiment of this invention, instead of the particulate material and foam forming pellets described above, a plurality of solidified open cell foam pieces are introduced into the annulus between the sand screen and the walls of the well bore by the above described carrier fluid. The solidified open cell foam pieces are uniformly packed into the annulus, and the open cells of the foam pieces are of a size such that the unconsolidated sand in the subterranean zone is prevented from entering the open cells and flowing through the permeable pack. Produced fluids, on the other hand, can freely flow through the open cells.

The solid open cell foam pieces can be produced on the surface utilizing thermoplastic or thermosetting resins or polymeric materials such as polystyrene, polyethylene, polypropylene, polyethers, phenolics, silicones, neoprene, natural rubber, cellulose acetate, polyurethanes and the like. The open cell structure of the foam can be produced by incorporating an inert gas into the resin or polymeric material utilized under pressure. When the resin or polymeric material containing the gas is released to atmospheric pressure, the gas forms open cells in the material prior to when the material cures. The gas can be formed in the resin or polymeric material when the material is heated by a blowing agent incorporated therein. After being formed, the solidified open cell foam is cut or shred into small pieces having sizes in the range of from about $\frac{1}{8}$" to about $\frac{1}{4}$".

In order to provide rigidity to the flexible pack of open cell foam formed in the annulus between the sand screen and the walls of the well bore, the open cell foam pieces can be coated with a hardenable resin composition after the open cell foam pieces have been slurried in a carrier fluid such as a completion brine. This technique is well known to those skilled in the art, and because the open cells are filled with brine prior to being coated, the coating does not plug the cells.

Particulate material and/or foam forming beads can also be combined with the solid open cell foam pieces, and the particulate material can also be coated with a hardenable resin composition.

The hardenable resin compositions which are useful for coating graded sand, the other types of particulate material mentioned above or the solid open cell foam pieces and consolidating them into rigid permeable masses are generally comprised of a hardenable organic resin and a resin to sand coupling agent. Such resin compositions are well known to those skilled in the art as is their use for consolidating particulate materials into hard permeable masses. A number of such compositions are described in detail in U.S. Pat. No. 4,042,032 issued to Anderson et al. on Aug. 16, 1977; U.S. Pat. No. 4,070,865 issued to McLaughlin on Jan. 31, 1978; U.S. Pat. No. 4,829,100 issued to Murphey et al. on May 9, 1989; U.S. Pat. No. 5,058,676 issued to Fitzpatrick et al. on Oct. 22, 1991; and U.S. Pat. No. 5,128,390 issued to Murphey et al. on Jul. 7, 1992; which are incorporated herein by reference.

Examples of hardenable organic resins which are particularly suitable for use in accordance with this invention are novolak resins, polyepoxide resins, polyester resins, phenol-aldehyde resins, urea-aldehyde resins, furan resins and urethane resins. These resins are available at various viscosities depending upon the molecular weights of the resins. The preferred viscosity of the organic resin used is generally in the range of from about 1 to about 1,000 centipoises at 80° F. However, as will be understood, resins of higher viscosities can be utilized when mixed or blended with one or more diluents. Diluents which are generally useful with the various resins mentioned above include, but are not limited to, phenols, formaldehydes, furfuryl alcohol and furfural.

The resin-to-sand coupling agent is utilized in the hardenable resin compositions to promote coupling or adhesion to sand or other similar particulate materials. Particularly suitable coupling agents are aminosilane compounds or mixtures of such compounds. A preferred such coupling agent is N-β-(aminoethyl)-gamma-aminopropyltrimethoxysilane.

The hardenable resin composition used is caused to harden by the heat of the subterranean zone or by contacting it with a hardening agent. When a hardening agent is utilized, it can be included in the resin composition (internal hardening agent) or the resin composition can be contacted with the hardening agent after the resin composition coated particulate material has been placed in the subterranean formation being completed (external hardening agent). An internal hardening agent is selected for use that causes the resin composition to harden after a period of time sufficient for the resin composition coated material to be placed in the subterranean zone. Retarders or accelerators to lengthen or shorten the hardening times can also be utilized. When an external hardening agent is used, the hardenable resin composition coated material is first placed in the zone followed by an over-flush solution containing the external hardening agent. Examples of internal hardening agents which can be used include, but are not limited to, hexachloroacetone, 1,1,3-trichlorotrifluoroacetone, benzotrichloride, benzylchloride and benzalchloride. Examples of external hardening agents which can be used include, but are not limited to, benzotrichloride, acetic acid, formic acid and inorganic acid such as hydrochloric acid. The hardenable resin compositions can also include surfactants, dispersants and other additives which are well known to those skilled in the art.

The resin coated materials used in accordance with this invention are preferably prepared by first suspending the solid materials used in a carrier fluid such as an aqueous completion brine and then injecting the hardenable resin composition into the brine whereby the solid materials are coated therewith. Thereafter, the carrier fluid containing the coated solid materials is pumped into the annulus between the sand screen and the walls of the well bore. As mentioned above, the hardenable resin composition is caused to harden by being heated in the formation or by an internal or external hardening agent. When solid foam forming pellets are included as a part of the solid materials they are caused to foam by being heated in the formation or by an external heat source or other activator.

Thus, an improved method of the present invention for completing a subterranean producing zone containing unconsolidated sand penetrated by a well bore is comprised of the following steps. A sand screen is placed in the subterranean producing zone to be completed and the annulus between the sand screen and the well bore in the zone is isolated. A mixture of particulate material and foam forming pellets are introduced into the annulus whereby the mixture of particulate material and foam forming pellets is packed into the annulus. Thereafter, the foam forming pellets are activated whereby foam is formed in the annulus which expands and solidifies therein thereby eliminating voids and strengthening the resulting permeable pack. The particulate material can be graded sand or other similar material such as ceramic, plastic or glass beads and the particulate material can be coated with a hardenable resin composition which hardens and consolidates the particulate material into a permeable mass.

Another improved method of the present invention comprises the following steps. A sand screen is placed in the zone and the annulus between the sand screen and the well bore in the zone is isolated. Thereafter, a plurality of solidified open cell foam pieces are introduced into the annulus between the sand screen and the well bore whereby the foam pieces are uniformly packed into the annulus. The open cells of the foam pieces are of a size such that unconsolidated formation fines and sand are prevented from entering the cells, but produced fluids can flow therethrough. The solid open cell foam pieces can be coated with a hardenable resin composition which subsequently hardens and consolidates the foamed pieces into a more rigid permeable mass. In addition to the solid open cell foam pieces, other particulate material such as graded sand can be included in the pack, and to insure that the pack does not include voids, foam forming pellets which are activated prior to when the resin hardens can be included in the pack.

Thus, by the methods of this invention, a permeable pack of solid materials is formed which does not include voids, has a long service life and effectively filters formation fines and sand out of produced fluids.

In order to further illustrate the methods of the present invention, the following example is given.

EXAMPLE

A slurry of open-cell foam pieces was prepared using an aqueous 2% solution of potassium chloride. A small volume of a hardenable epoxy resin composition was then slowly added to the slurry with stirring to ensure uniform coating of the open cell foamed pieces with the resin composition. The salt solution was decanted from the resin coated foam pieces and the foam pieces were packed into glass tubes under a torque of 5 foot pounds. The glass tubes were cured at 200° C. for 20 hours. The resulting consolidated open cell foam packs were tested for compressive strength and permeability. The average compressibility of the packs was about 250 psi and the average water permeability was about 80 Darcies.

Thus, the present invention is well adapted to attain the objects and advantages mentioned as well as those which are inherent therein. While numerous changes may be made by those skilled in the art, such changes are encompassed within the spirit of this invention as defined by the appended claims.

What is claimed is:

1. An improved method of completing a subterranean producing zone containing unconsolidated sands penetrated by a well bore comprising the steps of:
   (a) placing a sand screen in said zone;
   (b) isolating the annulus between said sand screen and said well bore in said zone;
   (c) introducing a mixture of particulate material and foam forming pellets into said annulus between said sand screen and said well bore whereby said mixture of particulate material and foam forming pellets are packed into said annulus; and
   (d) activating said foam forming pellets whereby foam is formed in said annulus which expands and solidifies therein thereby eliminating voids and strengthening the resulting permeable pack.

2. The method of claim 1 wherein said foam forming pellets are activated by the heat of said subterranean zone, steam injection or other suitable technique.

3. The method of claim 1 wherein particulate material is selected from the group of graded sand, ceramic beads, plastic beads and glass beads.

4. The method of claim 1 wherein said particulate material is graded sand.

5. The method of claim 1 wherein said mixture of particulate material and foam forming pellets are introduced into said annulus by a carrier fluid.

6. The method of claim 1 wherein said carrier fluid is selected from the group consisting of well completion brines, an aqueous nitrogen foam and an aqueous carbon dioxide foam.

7. The method of claim 1 wherein said particulate material is coated with a hardenable resin composition which hardens and consolidates said particulate material into a permeable mass.

8. The method of claim 7 wherein said hardenable resin composition is caused to harden by the heat of said subterranean zone.

9. The method of claim 7 wherein said hardenable resin composition is caused to harden by a hardening agent included in said composition.

10. An improved method of completing a subterranean producing zone containing unconsolidated sands penetrated by a well bore comprising the steps of:

(a) placing a sand screen in said zone;

(b) isolating the annulus between said sand screen and said well bore in said zone; and (c) introducing a plurality of solidified open cell foam pieces into said annulus between said sand screen and said well bore whereby said foam pieces are uniformly packed into said annulus, the open cells of said foam pieces being of a size such that said unconsolidated sand is prevented from entering said cells, but produced fluids can flow therethrough.

11. The method of claim 10 wherein said solidified open cell foam pieces are introduced into said annulus by a carrier fluid.

12. The method of claim 11 wherein said carrier fluid is selected from the group consisting of well completion brines, an aqueous nitrogen foam and an aqueous carbon dioxide foam.

13. The method of claim 10 wherein said solid open cell foam pieces are coated with a hardenable resin composition which hardens and consolidates said foam pieces into a permeable mass.

14. The method of claim 13 wherein said hardenable resin composition is comprised of an organic resin selected from the group consisting of novolak resins, polyepoxide resins, polyester resins, phenol-aldehyde resins, urea-aldehyde resins, furan resins and urethane resins.

15. The method of claim 14 wherein said hardenable resin composition is caused to harden by the heat of said subterranean zone.

16. The method of claim 14 wherein said hardenable resin composition is caused to harden by a hardening agent included in said resin composition.

17. The method of claim 10 wherein solid particles selected from the group consisting of graded sand, ceramic beads, plastic beads and glass beads are introduced with said open cell foam into said annulus between said screen and said well bore.

18. The method of claim 17 wherein said solid particles are graded sand.

19. The method of claim 17 wherein foam forming solid pellets activated by the heat of said subterranean zone, steam injection or other suitable technique are introduced with said solid open cell foam pieces and other solid particles into said annulus, said foam forming solid pellets expanding and solidifying after being activated thereby eliminating voids and strengthening the resulting permeable pack.

20. The method of claim 19 wherein said foam forming pellets are comprised of a thermoplastic material and a blowing agent.

* * * * *